United States Patent [19]

Wadman

[11] 3,981,666

[45] Sept. 21, 1976

[54] COMPRESSION DEVICE

[76] Inventor: Sipke Sikke Wadman, Burg. Bartelstraat 6, Hoogezand, Netherlands

[22] Filed: Oct. 17, 1974

[21] Appl. No.: 515,553

[30] Foreign Application Priority Data

Oct. 30, 1973 Netherlands ....................... 7314849

[52] U.S. Cl. ................................ 425/371; 198/500; 198/628; 264/89; 308/DIG. 1; 425/335; 425/DIG. 2

[51] Int. Cl.[2] .......................................... B29C 15/00

[58] Field of Search ............. 425/371, 335, 101, 97, 425/102, DIG. 2, DIG. 20, 107; 264/89; 198/165; 308/DIG. 1

[56] References Cited

UNITED STATES PATENTS

| | | | |
|---|---|---|---|
| 756,600 | 4/1904 | Dodge | 425/DIG. 2 |
| 2,135,763 | 11/1935 | Nicholson | 425/DIG. 2 |
| 3,885,901 | 5/1975 | Reiners | 425/371 |
| 3,887,318 | 6/1975 | DeMets | 425/371 |

*Primary Examiner*—Francis S. Husar
*Assistant Examiner*—R. J. Charvat

[57] ABSTRACT

A compression device comprising two continuously circulating belts in operation, between which a layer of material has to be conditioned under pressure, particularly a compression device for compressing a mixture of fibers or fibrous material and synthetic resin at high pressures. The opposite runs of the belts are supported such that material is compressed by supporting bodies in which recesses are provided, into which in operation pressurized fluid is fed, which fluid can flow out of the recesses concerned only through the gap between a belt and the portion of the supporting body surrounding the recess, so that in normal operation this outflow of fluid produces a fluid film between the belts and the portions of the supporting bodies surrounding the recesses.

6 Claims, 5 Drawing Figures

COMPRESSION DEVICE

The invention relates to a compression device comprising two continuously circulating belts in operation, between which a layer of material has to be conditioned under pressure, particularly a compression device for compressing a mixture of fibres or fibrous material and synthetic resin.

In many processes it is necessary, in order to obtain a final or intermediate product, to subject the starting material of the product to a pressure for a given period af time.

If the pressure values are comparatively low, the material is passed in between two belts continuously circulating in operation so that the material can be subjected to pressure in a continuous process. However, in many cases very high pressures are required and the use of continuously circulating belts has hitherto appeared not to be possible for practical purposes. In the manufacture of hardboard sheets by the so-called dry process, for example, a mixture of wood fibre and synthetic resin is compressed. This mixture of fibres and synthetic resin is frequently precompressed to a given extent in a press comprising continuously circulating belts, but the final compression under high pressure has hitherto been carried out with the aid of a discontinuously operating press in which the material is kept under the required pressure between two stationary plates for a given period of time. The use of such a discontinuously operating press at the end of a process which can otherwise be completely carried out continuously disturbs and delays a smooth performance of the manufacture.

The invention has for its object to provide a compression device of the kind set forth, which may also be employed for exerting high pressure on the material.

According to the invention this can be achieved by supporting the opposite runs of the belts between which the material is compressed by supporting bodies in which recesses are provided, into which in operation pressurized fluid is fed, which fluid can flow out of the recesses concerned only through the gap between a belt and the portion of the supporting body surrounding the recess so that in normal operation ths outflow of fluid produces a fluid film between the belts and the portions of the supporting bodies surrounding the recesses.

In this way the pressure exerted by the fluid on the belts can be correctly controlled, in particular in the areas where the belts are located opposite the portions of the supporting bodies surrounding the recesses so that even if the belts exert very high pressures on the material to be compressed, no direct contact will obtain between the supporting bodies and the belts so that the belts can be displaced substantially without friction with respect to the supporting bodies and damage of belts and supporting bodies is avoided, whilst the drive of the belts requires comparatively little energy.

The size of a sectional area of a recess parallel to the belt is preferably not more than 9 to 10 square cms so that even in the event of irregular feed of the quantity of material to be compressed the belt does not exhibit a tendency to bend down opposite a recess. It should be noted that it is known per se to support the active belt portions in a press comprising endless belts by means of a layer of fluid in a chamber bounded at the circumference by elastic sealing tags. In this case the fluid is fed into and withdrawn from the chamber through a plurality of inlet and outlet ducts directly communicating with the chamber, where no pressure control on the whole belt surface opposite the chamber can be obtained and no pressure build-up between the belt and the chamber boundaries takes place. The danger of a contact between the belt and stationary parts of the system and undesirable sagging of the belt cannot always be avoided in this case.

The invention will now be described more fully with reference to embodiments shown in the accompanying Figures of the construction in accordance with the invention.

Figure 1:
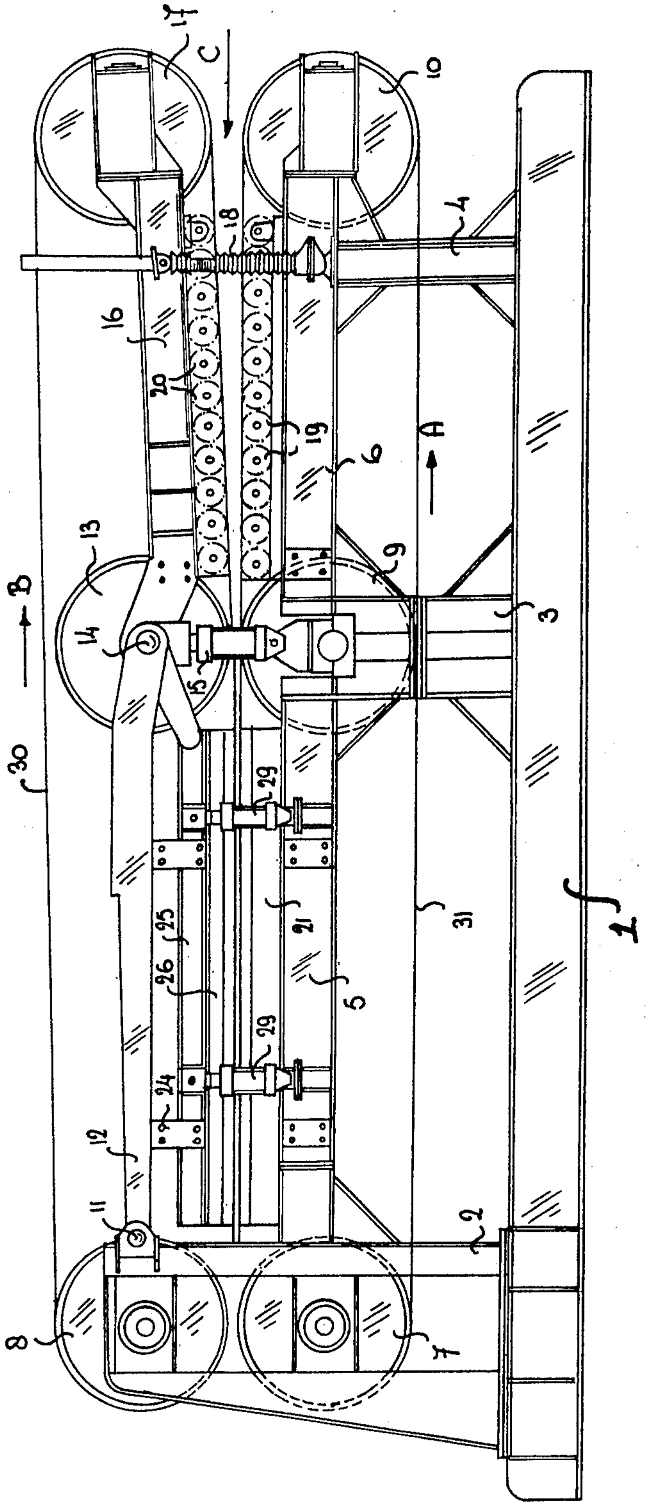
FIG. 1 is a schematic side elevation of a compression device in accordance with the invention.

The compression device shown in FIG. 1 comprises a bed 1, on which are erected upright columns 2, 3, and 4, which are interconnected by transverse beams 5 and 6. The columns 2 support two drums 7 and 8, arranged one above the other and adapted to rotate about horizontal shafts. The columns 3 also hold a drum 9 adapted to rotate about a horizontal shaft and near the columns 4 a drum 10 adapted to rotate about a horizontal shaft is arranged at the end of the frame beam 6.

With the top ends of the columns 2 located on either side of the drums 7 and 8 are coupled the ends of beams 12 by means of horizontal stubs 11, whereas the other ends of the beams 12 are located at the level of the columns 3 located on either side of the drum 9 and hold a drum 13 adapted to rotate about a horizontal shaft and arranged above the former drum. Between the stubs 14 of the drum 13 and the columns 3 hydraulic setting cylinders 15 are arranged.

Around the stubs 14 are furthermore adapted to rotate beams 16, which extend away from the stubs 14 towards the columns 4 and in the ends of the beams 16 remote from the stubs 14 a drum 17 adapted to rotate about a horizontal shaft is journalled approximately over the drum 10. Between the top ends of the columns 4 and the ends of the beams 16 located near the drum 17 screw spindles 18 are arranged for turning the beams 16 about the stubs 14.

The beam 6 supports a large number of rollers 19 adapted to rotate about horizontal rotary shafts in close proximity of one another. In a similar manner rollers 20 adapted to rotate about horizontal shafts are supported from a beam 16.

Figure 2:
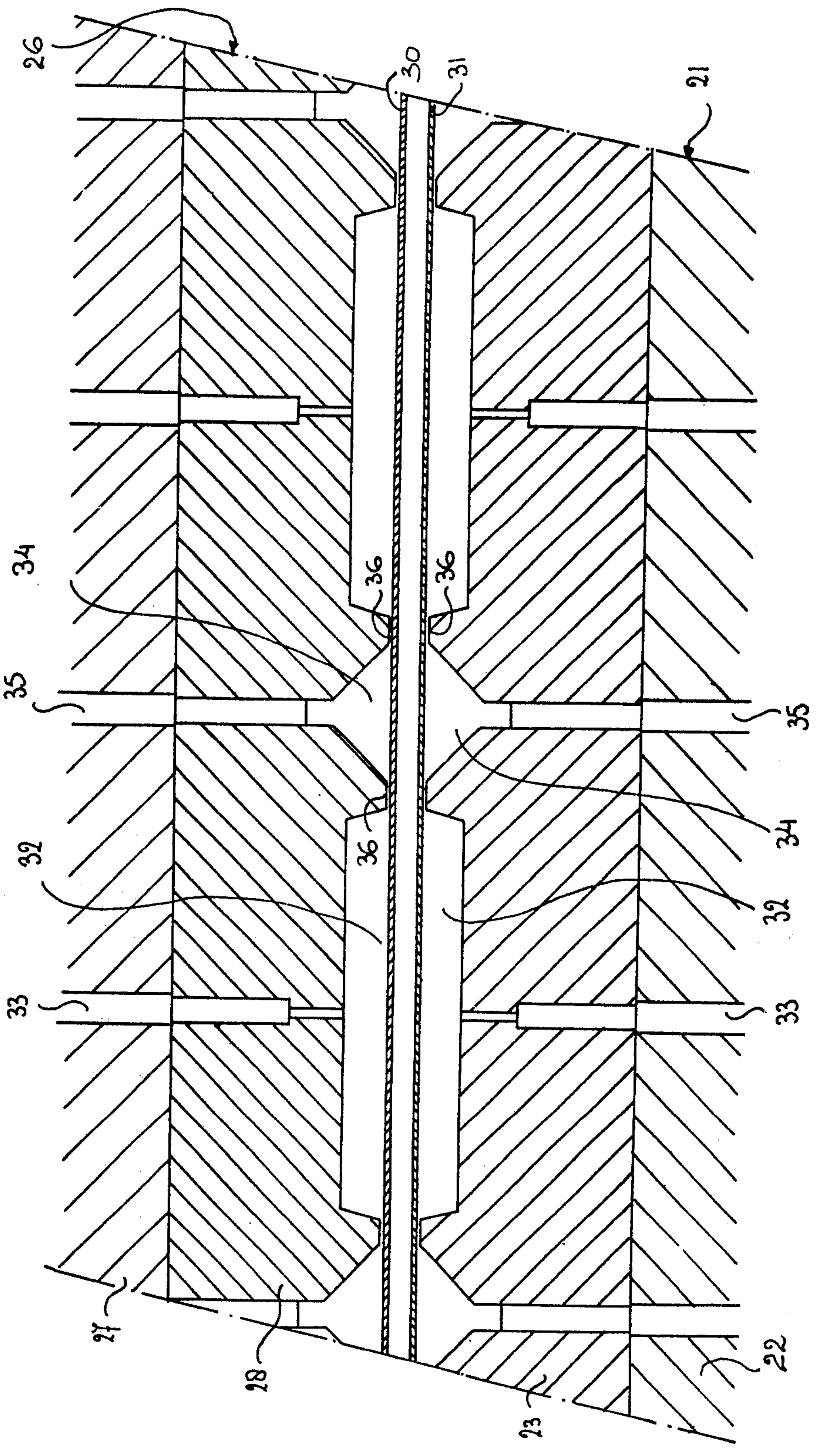
FIG. 2 is an enlarged sectional view of the continuously circulating belts and the supporting bodies for these belts.

The beam 5 hold a supporting body 21 comprising in this embodiment a metal base plate 22 and a plate 23 bearing thereon and made from slightly elastic material, for example, hard rubber (FIG. 2).

To the beams 12 are secured by means of supports 24 beams 25 extending parallel to the beams 5 and carrying a supporting body 26 suspended to said beams 25. The supporting body 26 is also formed by a metal base plate 27 and a plate 28 of slightly elastic meterial, for example, hard rubber. (FIG. 2). Between the beams 5 and 25 hydraulic setting cylinders 29 are arranged.

Around the drums 8 and 17 is passed an endless, preferably metallic, non-perforated belt 30, the lower run of which is guided (see FIG. 1) also along the rollers 20, the drum 13 and the lower surface of the supporting body 26. In a similar manner an endless, non-perforated, preferably metallic belt 31 is passed around the drums 7 and 10, the upper run of said belt being, moreover, passed along the rollers 19, the drum 9 and the top surface of the supporting body 21.

In operation the belt 31 circulates in the direction of the arrow A, whereas the belt 30 circulates in the direction of the arrow B so that the material can be passed in the direction of the arrow C between the belts. From FIG. 1 it will be apparent that the distance between the opposite, relatively co-operating runs of the belts between which the material is passed gradually decreases in the region where these belt runs are supported from the rollers 19 and 20, whereas said distance between the relatively co-operating belt runs between the supporting bodies 21 and 26 is kept substantially constant.

It will appear from FIG. 2 that the plates 23 and 28 have recesses 32, with which communicate channels 33. Between the recesses 33 further recesses 34 are provided in the plates 28 and 23, ducts 35 being connected with the recesses 34. In this way comparatively narrow ridges 36 are formed all around the recesses between the recesses 32 and 34 opposite the endless belts 30 and 31.

Figure 3:
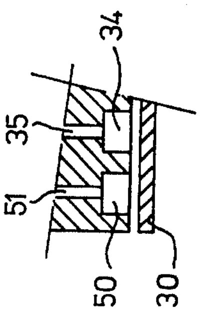
FIG. 3 shows schematically a sealing structure near one side of a supporting body.

The size of a sectional area of a recess in a plane parallel to a belt will, in general, not exceed 3 × 3 cms or in the case of a round recess the diameter thereof will not exceed 3 cms and preferably it does not exceed 1 to 1.5 cms. As a matter of course, the recesses need not be accurately square or round; they may be rectangular, quadrangular, elliptical or the like. Near the sides of the supporting body an uninterrupted groove 50 is provided in the supporting body. Through passages 51 pressurized air can be fed into the groove 50 (FIG. 3).

In operation the material to be compressed is fed in between the belts 30 and 31 and the upper supporting body 26 for the upper endless belt 30 can be drawn or pushed with a heavy force towards the stationary supporting body 21 for the lower endless belt 31 in order to excert a high pressure on the material located between the belts 30 and 31. In operation pressurized fluid is fed through the ducts 33 into the recesses 32. This fluid tends to flow away between the ridges 36 and the opposite sides of the belts 30 and 31 into the chambers 34, in which no excessive pressure is prevailing and from where leakage fluid can be conducted away through the ducts 35. In this way a fluid film is produced between the ridges 36 and the belts 30 and 31 so that a direct contact between the supporting bodies and the endless belts is avoided and practically no friction is involved. Even at the occurence of irregularities in the thickness of the inserted layer no disturbance will come up since in the event of abrupt increases in pressure at the area of a ridge 36 the force exerted thereon will be transferred via the fluid layer to the ridge 36, which is capable of giving way to some extent because the plates 23 and 28 are made of slightly resilient material so that the fluid film need not be disturbed and a direct contact between the supporting body concerned and the circulating belt is avoided. If, for example, in operation the thickness of the fluid film is 50 $\mu$ it can be ensured by an appropriate choice of the rigidity of the rubber that, for example, at a pressure variation of 10 percent a depression of the rubber of 100 $\mu$ occurs, whilst the fluid film is maintained.

Since, as stated above, the sectional area of a recess is smaller than about 900 square mms, preferably equal to or smaller than 100 to 225 square mms, the surfaces of those portions of the belt which are not located opposite the rims or ridges 36 surrounding the chambers of the supporting body are also comparatively small so that the risk of undesirable indentation of the belt portions opposite the chambers, for example, due to irregularities in the inserted layer of material is eliminated. The introduction of pressurized air into the groove 50 prevents leakage fluid from flowing out of the outermost chambers 34 along the side edges of the belts and from soiling the finished product. The air introduced will escape partially through the outermost chambers 34 and partially along the outer sides of the belts 30 or 31.

When using this construction direct contact between the endless belts and the supporting bodies for the belts is avoided, even if a very high pressure is exerted on the material located between the belts so that damage of the belts and/or the supporting bodies will not occur, whilst the energy required for driving the belts may be comparatively slight. It is a further important advantage that it is, in addition, possible to influence the process performing in the material located between the belts by varying the temperature of the fluid introduced through the channels 33. In the manufacture of hardboard from a mixture of fibres and synthetic resin, for example, it is desirable not only to subject the material to a high pressure but also to maintain a comparatively high temperature for the period of compression. This may be achieved by introducing hot fluid via the channels 33.

In some cases it may be an objection for the belts 30 and 31 not to be supported over part of their length on either side of their points of contact with the drums 9 and 13. In order to eliminate this disadvantage the drums 9 and 13 may be replaced by further supporting bodies (not shown) extending between the ends of the roller tracks 19 and 20 around the ends of the supporting bodies 21 and 26, the surfaces facing the belts 30 and 31 having a shape matching the curved and/or converging trajectory of the belts in this region. These additional supporting bodies are constructed in a manner similar to the supporting bodies 21 and 26 so that also in this case a friction-less hold of the belts can be ensured in the same manner as disclosed for the hold of the belts 30 and 31 by the supporting bodies 21 and 26. It may be appropriate to feed fluid to the recesses in the additional supporting bodies along the path where the distance between the belts gradually decreases at a pressure exceeding the pressure with which fluid is fed into the recesses of the supporting bodies 21 and 26. The additional supporting body may be integral with the supporting body 21 or 26.

Figure 4:
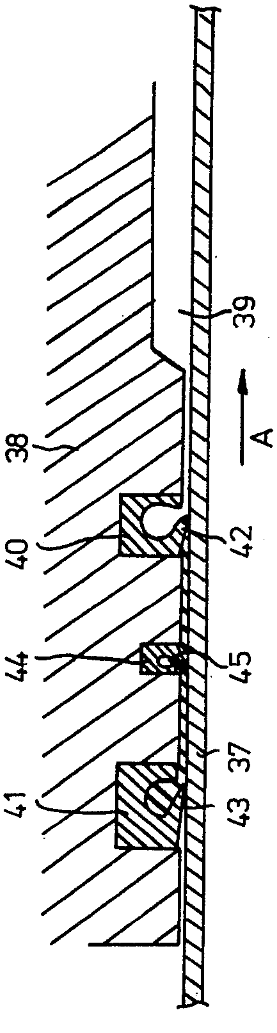
FIG. 4 shows schematically a sectional view of a second embodiment of the support of a circulating belt.
Figure 5:
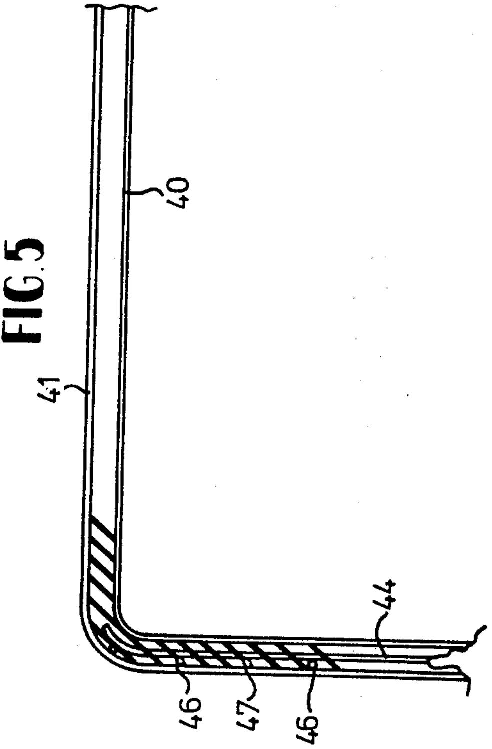
FIG. 5 is a diminished bottom view of part of the supporting body shown in FIG. 4.

A further embodiment of a supporting body is shown schematically in FIGS. 4 and 5. In this embodiment an endless steel belt 37 is adapted to move along a supporting body 38 in which a recess 39 is provided substantially throughout the length and width of said supporting body 38. The recess is surrounded by two hollow bushes 40 and 41 having sealing tags 42 and 43 respectively bearing on the belt 37. On that side where the belt 37 moving in the direction of the arrow A first arrives beneath the supporting body 38 a further bush 44 having a tag 45 bearing on the steel belt is arranged between the two bushes 40 and 41. Between the bushes 41 and 44 are provided a plurality of inlet apertures 46 and outlet apertures 47 intermediate therebetween. In operation highly pressurized fluid, for example, water will be introduced into the space 39 for supporting the belt run moving along the supporting body, whilst water at low pressure is fed into the sealing area between the bushes 40 and 41.

The run of the steel belt moving along the supporting body 38, which is preferably made of bronze, rubber or similar material, so to say, floats on the fluid subjected to a high pressure in operation. The low pressure fluid is supplied through the apertures 46 and conducted away through the outlet apertures 47. Any soil carried along the belt beneath the sealing tag 43 will be retained by the tag 45 extending in the opposite direction and extending transversely of the direction of movement of the belt and the retained soil will be conducted away by the water flowing through the space between the tags 43 and 45.

Also with this construction an effective support for the steel belt can be obtained by the fluid film between the belt and the essentially rigid supporting body without the steel belt coming into contact with the supporting body so that a minimum of friction is involved. The bushes are constructed so that they can absorb a shift of the belt with respect to the supporting body of 100 $\mu$ at the least without the steel belt coming into contact with the supporting body.

The constructions disclosed above are particularly suitable, for example, for the manufacture of hardboard or similar objects of fibrous material. In this case it is important for the material to be kept compressed by a constant pressure for the hardening period since deformations occuring during the hardening process might destroy the bonds already established. A second important reason for maintaining a constant pressure substantially anywhere resides in that as a result the water absorbing properties of the hardboard will anywhere be the same. A non-uniform water absorption of hardboard is highly undesirable since this would involve a non-uniform expansion of the board due to water absorption. By using the construction enbodying the invention small variations in the thickness of the layer of the material introduced between the belts can be compensated for without involving appreciable differences in the pressure exerted on the material.

I claim:

1. In a compression device comprising two continuously circulating belts between which a layer of material is to be conditioned under pressure, the improvement comprising:

a pair of supporting bodies mounted on said device, between which both said belts pass in spaced-apart relationship, thereby defining a space for conditioning said material between said belts;

each of said supporting bodies having a plurality of first recesses facing a respective belt and defining pressurized fluid sources, a plurality of second recesses facing a respective belt and defining fluid discharge means, and unobstructed gaps between the respective belts and the portions of said supporting bodies between recesses;

whereby fluid can flow out of said fluid sources, through said gaps, and into said discharge means, in order to maintain a fluid film between said moving belts and said portions of said supporting bodies between recesses.

2. A compression device as claimed in claim 1 characterized in that the size of a sectional area of a recess parallel to the belt does not exceed 10 square cms.

3. A compression device as claimed in claim 1, characterized in that near the side of the supporting body a groove is provided, which groove communicates with means for the supply of pressurized air.

4. A compression device as claimed in claim 1, including guide means for said belts, said guide means defining a path for said belts which bring said belts closer together as said belts approach the area of said supporting bodies, and including further supporting bodies joining the supporting bodies for guiding the belts during their movement towards the first-mentioned supporting bodies, said further supporting bodies being provided in a manner similar to the first-mentioned supporting bodies with recesses to which pressurized fluid can be supplied.

5. A compressing device as claimed in claim 1 characterized in, that at least those parts of the supporting bodies in which the recesses are provided are made of slightly elastic material, such that said material can yield under influence of pressure occuring during normal use of the device.

6. A compression device as claimed in claim 5 characterized in that the size of a sectional area of a recess parallel to the belt amounts to 100 to 225 square mms.

* * * * *